United States Patent
McConnell et al.

(10) Patent No.: US 9,779,874 B2
(45) Date of Patent: Oct. 3, 2017

(54) SINTERING OF HIGH TEMPERATURE CONDUCTIVE AND RESISTIVE PASTES ONTO TEMPERATURE SENSITIVE AND ATMOSPHERIC SENSITIVE MATERIALS

(75) Inventors: John E. McConnell, Simpsonville, SC (US); John Bultitude, Simpsonville, SC (US); Abhijit Gurav, Simpsonville, SC (US)

(73) Assignee: KEMET Electronics Corporation, Simpsonville, SC (US)

(*) Notice: Subject to any disclaimer, the term of this patent is extended or adjusted under 35 U.S.C. 154(b) by 167 days.

(21) Appl. No.: 13/542,375

(22) Filed: Jul. 5, 2012

(65) Prior Publication Data

US 2013/0010400 A1    Jan. 10, 2013

Related U.S. Application Data

(60) Provisional application No. 61/505,811, filed on Jul. 8, 2011, provisional application No. 61/505,825, filed on Jul. 8, 2011.

(51) Int. Cl.
| | |
|---|---|
| *H01G 4/30* | (2006.01) |
| *B05D 3/06* | (2006.01) |
| *H01G 13/06* | (2006.01) |
| *H01G 13/02* | (2006.01) |
| *H01G 4/12* | (2006.01) |

(52) U.S. Cl.
CPC .............. *H01G 4/30* (2013.01); *B05D 3/06* (2013.01); *H01G 4/1227* (2013.01); *H01G 13/02* (2013.01); *H01G 13/06* (2013.01); *Y10T 29/43* (2015.01)

(58) Field of Classification Search
CPC ............ H01G 4/40; H01G 4/33; H01G 4/306; H01G 13/02; H01G 13/06; H01G 4/1227; Y10T 29/43; B05D 3/06
See application file for complete search history.

(56) References Cited

U.S. PATENT DOCUMENTS

| | | | |
|---|---|---|---|
| 6,370,013 B1* | 4/2002 | Iino et al. | 361/306.3 |
| 6,992,001 B1* | 1/2006 | Lin | 438/612 |
| 8,557,352 B2 | 10/2013 | Miyamoto et al. | |

(Continued)

FOREIGN PATENT DOCUMENTS

| | | |
|---|---|---|
| EP | 2051570 | 4/2002 |
| WO | WO 03021614 | 3/2003 |

OTHER PUBLICATIONS

International Search Report and Written Opinion of the International Searching Authority; ISA/KR; PCT/US2012/045975; Kemet Electronics Corporation et al.

(Continued)

*Primary Examiner* — Livius R Cazan
(74) *Attorney, Agent, or Firm* — Joseph T. Guy; Perkins Law Firm, LLC (57) ABSTRACT

An method of forming a metal foil coated ceramic and a metal foil capacitor is provided in a method of making a metal foil coated ceramic comprising providing a metal foil; applying a ceramic precursor to the metal foil wherein the ceramic precursor comprises at least one susceptor and a high dielectric constant oxide and an organic binder, and sintering the ceramic precursor with a high intensity, high pulse frequency light energy to form the metal foil ceramic.

25 Claims, 4 Drawing Sheets

(56) References Cited

U.S. PATENT DOCUMENTS

| | | |
|---|---|---|
| 2003/0175411 A1* | 9/2003 | Kodas et al. .................. 427/58 |
| 2004/0042155 A1 | 3/2004 | Ritter et al. |
| 2004/0126484 A1* | 7/2004 | Croswell et al. .............. 427/79 |
| 2005/0208203 A1* | 9/2005 | Church et al. ................. 427/58 |
| 2006/0282999 A1 | 12/2006 | Majumdar et al. |
| 2006/0292777 A1 | 12/2006 | Dunbar |
| 2010/0270261 A1 | 10/2010 | Figueroa et al. |
| 2011/0043963 A1* | 2/2011 | Bultitude et al. ......... 361/321.4 |
| 2014/0057428 A1 | 2/2014 | Yaniv et al. |

OTHER PUBLICATIONS

Stan Farnsworth, Novacentrix Advanced Curing for Printed Electronics, Rev. 0708. www.novacentrix,com.

\* cited by examiner

SINTERING OF HIGH TEMPERATURE CONDUCTIVE AND RESISTIVE PASTES ONTO TEMPERATURE SENSITIVE AND ATMOSPHERIC SENSITIVE MATERIALS

CROSS-REFERENCE TO RELATED APPLICATIONS

The present application claims priority to pending U.S. Provisional Patent Appl. No. 61/505,811 filed Jul. 8, 2011 and to pending U.S. Provisional Patent Appl. No. 61/505,825 filed Jul. 8, 2011 both of which are incorporated herein by reference.

BACKGROUND

The present invention is related to an improved method for forming electronic components. More specifically, the present invention is related to a sintering method wherein materials which require high sintering temperatures can be manufactured with an integral material which is not compatible with high temperature sintering thereby allowing the formation of capacitive structures which were previously unavailable and providing functionalized capacitors without compromising the capacitance.

Capacitors are well known in the art of electronic circuitry and they find widespread use in various applications as widely known and practiced in the art. In general, a capacitor comprises at least two conductors with a dielectric between adjacent conductors. Metals are the preferred conductor, due to their low resistance, and ceramics are the preferred dielectric due to their high dielectric constants. Unfortunately, ceramics must be fired at high temperature to achieve adequate density and these temperatures are often detrimental to the metal. In the case of base metals a neutral or reducing atmosphere is required that adds further restraint on developing compatible ceramics.

Electrolytic capacitors typically use high melting point conductive metals such as tantalum, niobium or aluminum, as the conductive anode or even metal oxides such as niobium oxide. Thin oxide layers are formed on these as the dielectric but since they are very thin the voltage handling capability of the resulting capacitors is limited.

Metalized polymeric films are also used to form capacitors. In these cases the volumetric efficiency of the capacitors are limited by the low dielectric constant of the polymer. Furthermore most polymer film capacitors are not suitable for use at higher temperatures due to their low melting point. Neither film nor electrolytic capacitor technologies can be easily combined with high dielectric constant ceramics since they do not allow for sintering of the ceramic. As a result the applications for these types of capacitor are limited.

Another type of capacitor widely used is multi-layered ceramic capacitors which are well known in the art and used through the electronics industry. There has been an ongoing desire to incorporate additional functionality into multi-layered ceramic capacitor components, such as resistance, inductance, fuses, and the like, to allow for further miniaturization of electronic circuits. The high temperature sintering requirements of the ceramics in multi-layered ceramic capacitors has made efforts to combine functionality very difficult.

Multi-layer ceramic capacitors (MLCC) are formed by interleaving thin layers of ceramic insulator electrodes of opposed polarity and co-sintering to produce a monolithic component. The layering process requires the ceramic and electrode to be suspended in organic media. In general, the ceramic and metal layers are alternately cast, by one of a myriad of techniques, to form a monolith which is first heated to remove volatiles and then sintered as a monolith. The sintering process requires a high firing temperature, typically >800° C. Air atmospheres can be used in the case of noble, or precious, metals such as palladium, silver, gold or their alloys. For base metals such as nickel or copper a reducing atmosphere, typically nitrogen/hydrogen is required to prevent oxidation of the metal and the sintering is followed by an annealing at lower temperature to replace the oxygen vacancies formed in the dielectric which returns the ceramic to an insulating state. The ceramic and electrode materials must be carefully matched during the layering and thermal processing to avoid stresses and subsequent flaws, such as delamination, that compromises the reliability of the final capacitor. This processing is complicated and consequently expensive.

After the sintered monolith is sintered connections to the inner electrodes must be formed by applying termination materials, typically thick film pastes, followed by additional sintering to contact the inner electrodes of the MLCC. This sintering step may be detrimental to the ceramic and/or internal conductors.

There are two metals systems typically used to create the internal electrodes of multi-layered ceramic capacitors. One system relies on precious metals such as silver, palladium, platinum or combinations thereof. Precious metals are advantageous since they can be used with air sinterable ceramics which is a significant manufacturing convenience. Unfortunately, precious metals are expensive and the price is highly volatile which leads to cost fluctuations in manufacturing. Base metal internal electrodes, such as nickel, have the advantage of lower material cost yet they are easily oxidized at sintering temperatures and therefore the ceramic must be fired in a reducing atmosphere, such as forming gas or nitrogen. As would be easily realized mixed metal systems can only be contemplated for a specific range of metals and alloys formulated to be compatible with ceramics due to these firing complexities.

There has been a long felt need for a method of forming capacitors, and of forming functionalized capacitors, using ceramic dielectrics which are sintered to achieve high density, without detrimental to the conductive layer or to the functionalized layer or terminations. This has previously been considered impossible.

SUMMARY

It is an object of the invention to provide an improved method for manufacturing capacitors with conductive layers and dielectrics which are otherwise incompatible under sintering conditions suitable for use in forming either component.

It is another object of the invention to provide a method of manufacturing a capacitor comprising terminations and additional functionality wherein the terminations or additional functionality can be applied without compromising previously sintered ceramic or conductive layer. It is an objective of this invention to eliminate the need for co-sintering stage of ceramics with metals or terminations.

These and other advantages, as will be realized, are provided in a method of making a metal foil coated ceramic comprising:
providing a metal foil;
applying a ceramic precursor to the metal foil wherein the
  ceramic precursor comprises at least one susceptor and a
  high dielectric constant oxide and an organic binder, and sintering the ceramic precursor with a high intensity, high pulse frequency light energy to form the metal foil ceramic.

In a further embodiment of this invention the metal foil is formed on a polymeric carrier film, for ease of manufacture with respect to achieving a thin metal deposit and this is film is then incorporated within the final capacitor.

Yet another embodiment is provided in a method for forming a capacitor comprising:
providing a multilayered ceramic capacitor stack comprising parallel electrodes of alternating polarity with dielectric between adjacent electrodes wherein electrodes of common polarity are exposed;
applying an electrode paste to the multilayered ceramic capacitor stack wherein the electrode paste is in electrical contact with the electrodes of common polarity;
sintering the electrode paste to form an external termination;
printing a metal paste in a predetermined pattern on the multilayered ceramic capacitor stack; and
sintering the metal paste;
wherein at least one of the sintering of the electrode paste or the sintering of the metal paste comprises sintering with a high intensity, high pulse frequency light energy, preferably with wavelengths in the ultraviolet range.

Yet another embodiment is provided in a capacitor with a bleed resistor integral thereto. The capacitor has first base metal internal electrode terminating at a first external termination and second based metal internal electrodes terminating at a second external termination with ceramic between the first base metal internal electrodes and the second external electrodes. A resistive trace is on the capacitor wherein the resistive trace is electrically connected to the first external termination and the second external termination wherein the resistive trace comprises ruthenium dioxide, tantalum nitride or a deposit of nickel chromium.

DESCRIPTION

The present invention is specific to the formation of capacitive couples wherein sintered ceramic dielectrics can be employed without detriment to the conductive metal layer. More specifically, the present invention is specific to the formation of additional functionality and terminations on a capacitor without detriment to the ceramic or conductive metal layer in the capacitor. Additionally, the present invention is related to the formation of terminations and conductive layers which can be selectively sintered without heating adjacent layers.

In an embodiment of the invention the ceramic precursor has incorporated therein a susceptor oxide which absorbs high frequency pulsed light energy. A particular advantage is that the heating remains relatively localized in the ceramic with minimal heating of the metal. Chemically similar materials are incorporated in the dielectric with nano-oxide or nano-metal susceptors present to allow the sintering stage to be performed by high frequency pulsed light as will become apparent in the description below.

The ceramic precursor materials of the invention contain a nano-sized oxide or nano-metal that acts as a susceptor to the high frequency pulsed light energy. The resulting heating process results in sintering of the ceramic composite. In the case of the metal susceptors these are selected to oxidize during the process and to form a part of the final ceramic. Furthermore, the nano-oxides are selected from a large range of relatively low melting point materials that are known to form sintering aids. Nanometals of copper and silver are particularly suitable but not restricted thereto with other metallurgies and other metals, such as lead, also being suitable susceptors which are oxidized during the application of high frequency pulsed light energy. Suitable nano-oxide susceptors include but are not limited to CuO, $Ag_2O$, $Cu_2O$, $BaCuO_2$, PbO, $Bi_2O_3$, $ZnO/B_2O_3$, $Li_2O$, $Li_2SiO_3$, $CaO/B_2O_3$, $SiO_2$, $GeO_2$ and $SrO/B_2O_3$. To achieve a high dielectic constant, these susceptors are combined with oxides such as $BaTiO_3$, $SrTiO_3$, $CaZrO_3$, $Pb(Mg_{1/3}Nb_{2/3})O_3$, $Pb(Zr_{1/2}Ti_{1/2})O_3$ including $La_2O_3$, $PbTiO_3$ and mixtures or solid solutions of these.

During the high frequency pulsed light process the metals and oxides can be preferentially selected to perform as transient liquid phase sintering aids (TLPSA). TLPSAs form a liquid phase that facilitate the sintering process and remain as a grain boundary phase or are absorbed into the bulk ceramic on cooling. This has shown to be effective in a number of ceramic dielectric systems as noted in the following reactions:

$$BaTiO_3+Cu+BaO(excess\ stiocheometry)=BaTiO_3+BaCuO_2$$

$$Pb(Mg_{1/3}Nb_{2/3})O_3+Cu+BaO(excess\ stiocheometry)=Pb(Mg_{1/3}Nb_{2/3})O_3+BaCuO_2$$

$$Pb(Zr_{1/2}Ti_{1/2})O_3+Cu=Pb(Zr_{1/2}Ti_{1/2})O_3+CuO$$

$$Pb(Zr_{1/2}Ti_{1/2})O_3+Pb(excess)=Pb(Zr_{1/2}Ti_{1/2})O_3+PbO$$

$$BaTiO_3+Ag=BaTiO_3+\tfrac{1}{2}Ag_2O$$

$$BaTiO_3+B=BaTiO_3+\tfrac{1}{2}B_2O_3\ and$$

$$CaZrO_3+B=CaZrO_3+\tfrac{1}{2}B_2O_3.$$

The main phases of the ceramic are preferably perovskite type oxides because of their high dielectric constants compared to polymer film, aluminum and tantalum oxides. Furthermore since the ceramic coatings are formed on a metal foil similar manufacturing processes can be employed to film capacitors.

The invention will be described with reference to the various figures forming an integral, non-limiting component of the instant disclosure. Throughout the description similar elements will be numbered accordingly.

Figure 1:
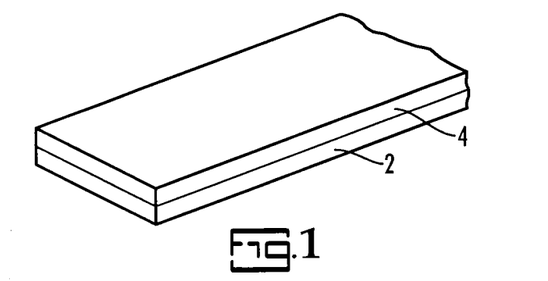
FIG. 1 is a top perspective schematic view of a precursor to an embodiment of the invention.
Figure 2:
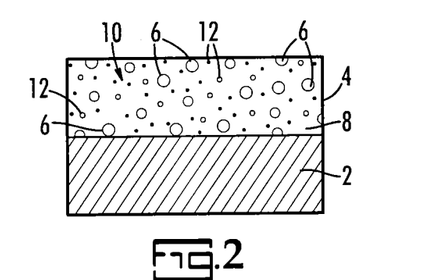
FIG. 2 is a partial side schematic view of a precursor to an embodiment of the invention.
Figure 3:
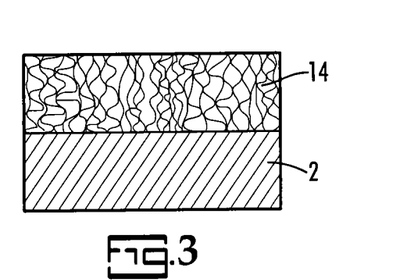
FIG. 3 is a partial side schematic view of an embodiment of the invention.

An embodiment of the invention is will be described with reference to FIGS. 1-3. In FIG. 1, an unsintered layered arrangement is illustrated wherein the metal foil, 2, has a ceramic dielectric precursor layer, 4, thereon. A partial cross-sectional view of the layered structure is illustrated in in FIG. 2 wherein the metal foil, 2, is relatively dense however the ceramic dielectric precursor layer comprises bulk metal oxide, 6, ceramic dielectric, 8, organic medium, 10, and susceptor oxide, 12. The ceramic dielectric precursor layer is sintered by a high frequency pulsed light energy, as will be more fully explained herein, which sinters the ceramic without significantly heating the metal layer. The resulting layered structure is illustrated in partial cross-section in FIG. 3 wherein the sintered dielectric, 14, has a high density and an adhesive bond to the metal layer, 2. The ceramic coated metal foil can be utilized in a metal foil ceramic capacitor by stacking or winding the resulting coated foil to produce a capacitor. By winding two of the ceramic coated metal foils a wound capacitor can be formed.

Figure 4:
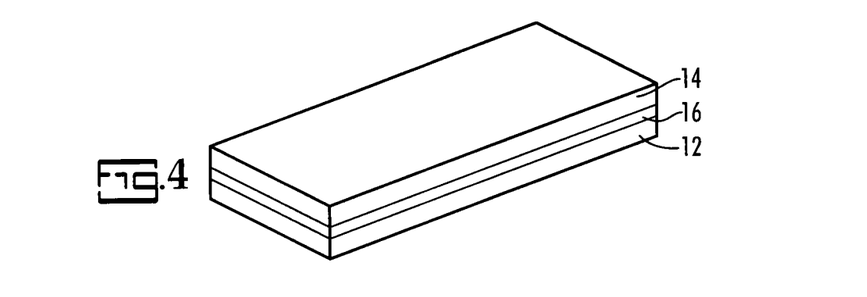
FIG. 4 is a top perspective schematic view of an embodiment of the invention.

An embodiment of the invention is illustrated in cross-sectional cut-away view in FIG. 4 wherein a nano-metal layer, 16, is provided to form a strong adhesive layer between the foil, 12, and the ceramic 14. A suitable nano-metal is copper which forms a copper-aluminate layer with aluminum foil. While not limited thereto the nano-metal is hypothesized to migrate to the interface during sintering to form a bond with the metal substrate.

Figure 5:
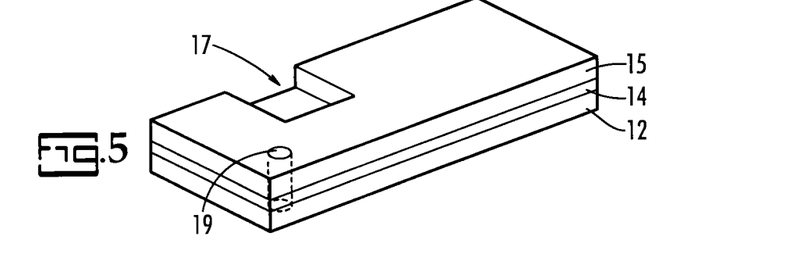
FIG. 5 is a top perspective schematic view of an embodiment of the invention.

An embodiment of the invention is illustrated in FIG. 5 wherein a secondary metal layer, 15, can be formed on top of the ceramic layer, 14, by applying a pastes or suspension filled with metal or metal oxides and reducing agents then applying high frequency light energy for a second time. The resulting metal-ceramic-metal sandwich is suitable for a single layer capacitor. This sandwich of material can be singulated to obtain many individual capacitors. Terminations can be added to these capacitors before or as part of their assembly into circuits. The secondary metal layer can be patterned, as represented by 17, by various printing techniques to form an electric circuit with a common decoupling capacitive layer through to a common electrode, the metal foil can subsequently be embedded in a circuit board. Components may be assembled on this circuit prior to the embedding process. Alternatively the metal foil on which the ceramic is deposited can be masked using conformal coating and etched away to form circuitry on both sides of this capacitive layer. Additional components may be assembled prior to embedding the layer within a circuit board. In addition the capacitive layer may be laser machined and vias, 19, added to connect both sides of the circuit.

In its simplest form the continuously coated foil is simply wound with another foil to form a ceramic capacitor between the 2 foils of opposed polarity. The foil may be coated by techniques such as doctor blade, comma coating, ink jet printing, screen printing, roll transfer printing, pad printing or gravure printing. The coated foil is exposed to high frequency pulsed light energy to sinter the susceptor and oxide combinations. A drying step to remove solvent from the suspension may be included before this exposure.

The present invention is particularly suitable for forming a wound capacitor. During the formation of typical wound capacitors, the winding process could result in cracking of the ceramic layer. It will be realized by those familiar with the behavior of polymer film capacitors that by using a foil such as aluminum on applying a current between the foil electrodes of opposed polarity through a flaw such as a crack a portion of the foil can be vaporized which is highly undesirable.

Since the metal layer required is very thin it may present difficulties with respect to winding and the loss of capacitance associated with self-healing is not desirable. For this reason alternative winding methods are described where the coated ceramic areas are defined in such a way that when wound the ceramic preferably remains in compression to mitigate crack formation.

The ceramic coating can be deposited on the metal foil in segmented areas in order to form a multiplicity of individual capacitors following processing and embedding. An insulated polymer can be impregnated into the gaps formed in the final capacitor to achieve a robust device or can be applied in the gaps between the ceramic and cured prior to winding.

Figure 6:
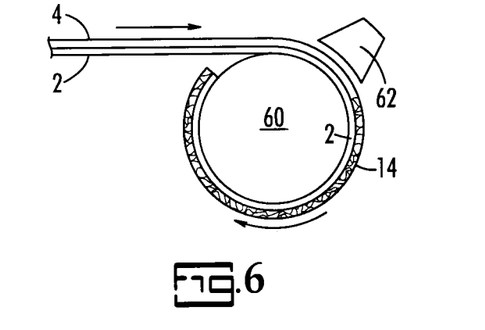
FIG. 6 is a side schematic view of an embodiment of the invention.

In the instant invention improvements in wound capacitors can be achieved by sintering the ceramic using high frequency pulsed light sintering on the curved surface of the coated film during the winding operation. This will be described with reference to FIG. 6. In FIG. 6, a foil, 2, such as a metal foil is covered with unsintered ceramic dielectric precursor, 4. As the layer is formed on a roll, 60, the ceramic is sintered by a high frequency pulsed light source, 62, thereby forming sintered ceramic, 14, on the surface of a rolled foil. This manufacturing process minimizes cracking.

Figure 7:
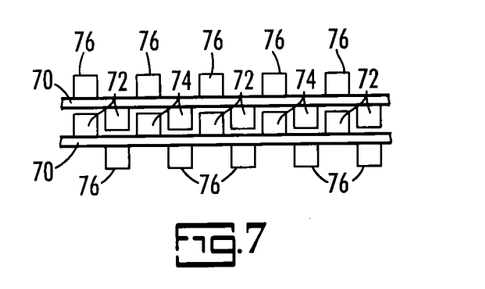
FIG. 7 is a side schematic view of an embodiment of the invention.
Figure 8:
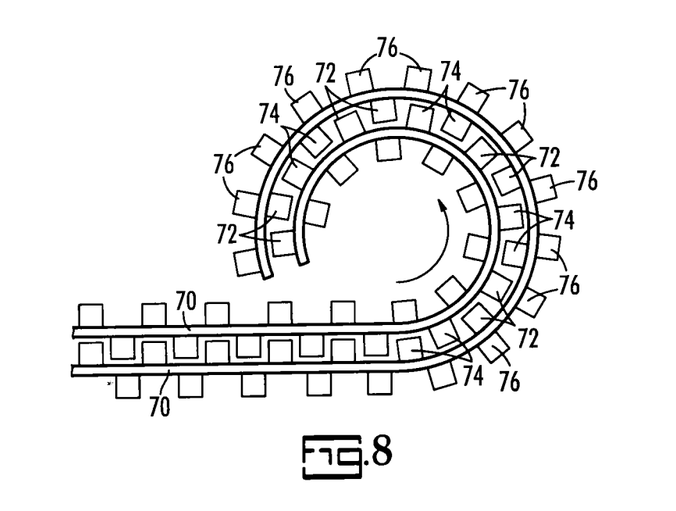
FIG. 8 is a side schematic view of an embodiment of the invention.

To avoid excessive stress in a continuous ceramic layer the ceramic can be deposited in segments as illustrated in FIG. 7. Polymer may be impregnated between the segments before or after the winding process. In FIG. 7, single electrode foils, 70, are formed with alternating islands of ceramic, 72, and polymer, 74, on one side and a spacer, 76, on the opposite side. The spacer is preferably polymeric. The foils are then wound to form a wound metal foil ceramic capacitor as illustrated in FIG. 8.

Alternatively the coated foil can be singulated and stacked to avoid bending of the ceramic thereby preventing cracks that could compromise the integrity of the ceramic coating. A foil coated on both sides has the advantage of increasing the overall dielectric thickness. An organic sealing compound can then be applied to the ends of the device and the alternate electrodes exposed by etching or sand blasting or cutting the molded part to expose the inner foil electrodes. Terminations can then be applied to obtain a stacked metal foil ceramic capacitor.

Figure 9:
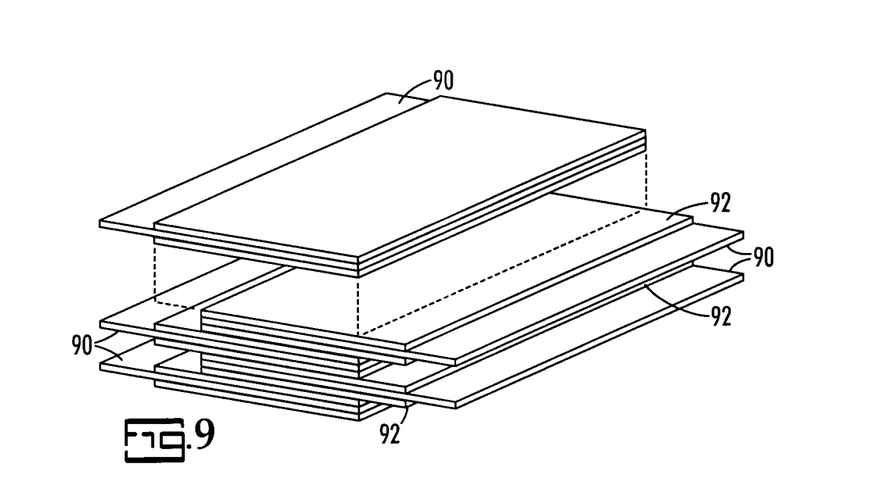
FIG. 9 is a partially exploded top perspective schematic view of an embodiment of the invention.
Figure 10:
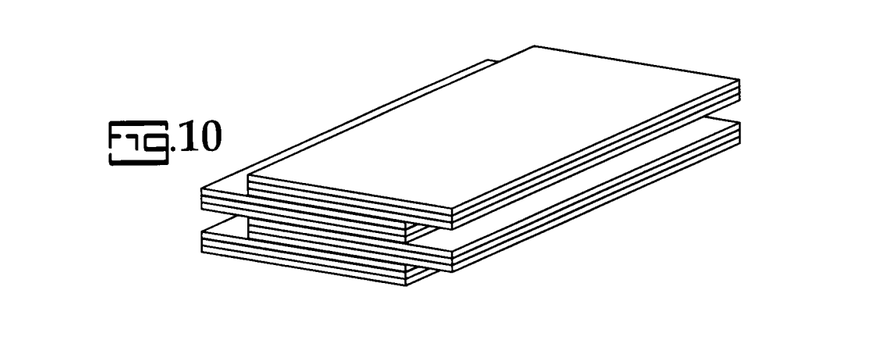
FIG. 10 is a top perspective schematic view of an embodiment of the invention.
Figure 11:
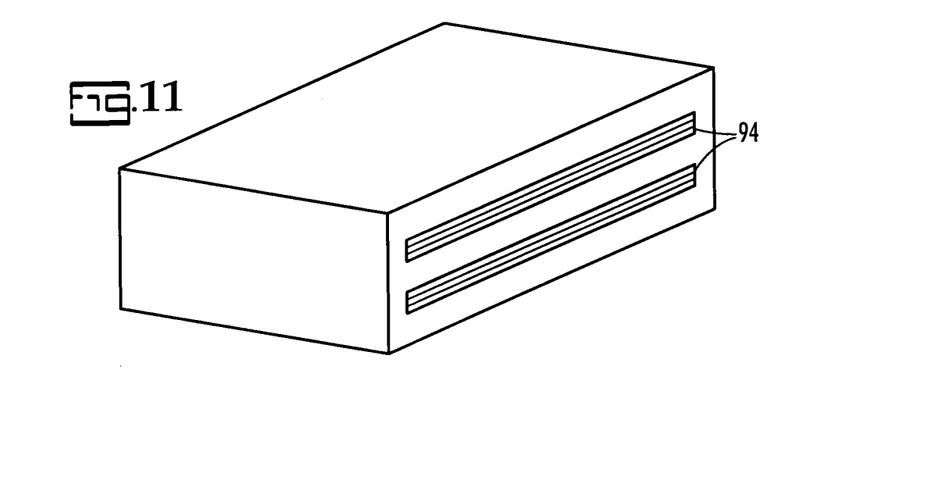
FIG. 11 is a partially exploded top perspective schematic view of an embodiment of the invention.

An embodiment of the invention is illustrated in partially exploded view in FIG. 9 wherein foil, 90, with ceramic dielectric, 92, on either side can be stacked with adjacent conductive layers extending oppositely outward as illustrated in FIG. 10. The stack is then segmented and overmolded to form a capacitor as illustrated in FIG. 11 wherein the electrodes, 94, of common polarity are on a common face.

The stacking of coated foils to produce a capacitor requires many singulation stages prior to the stacking process to produce the capacitor. For this reason a preferred process is to arrange the aforementioned insulating polymer between the ceramic regions in such a way that it allows the coated foil to be serpentine folded into a capacitor and commonly singulated. In this way the coated foils can be utilized to form many layers within a capacitor and the number of singulation operations is reduced.

A preferred application for this technology is in DC-link capacitors where economic high capacitance solutions are needed that can operate at high voltages, such as 200-1000V, that have low ESR so the capacitors can withstand high ripple currents. Ceramic dielectrics typically have breakdown voltages in the range 60-220V/µm but to avoid breakdown these will have to be operated at lower voltages 40-150V/µm. The coated ceramic must therefore be in the range 1-50 µm to operate at these voltages. For thicker coatings, such as >5 µm, multiple applications of printing and pulsed high frequency light energy may be required. Alternatively, foils coated on both sides may be combined to achieve dielectric layers consisting of two coatings as shown in FIGS. 9 and 10. In this case by winding the capacitor so the foil edges protrude it is possible to readily obtain two alternate electrode terminals in the final wound capacitor after molding and exposing the electrodes by etching or sand blasting or cutting.

The MFCC capacitors may be packaged in series to increase their voltage handling capability.

Metal foil ceramic capacitors are compared to a high energy density film capacitor by substituting the polymer with alternate ceramic based dielectrics as shown Table 1.

TABLE 1

Energy Density Comparisons

| | Capacitor type | | | |
|---|---|---|---|---|
| | Soft-Winding Thin Film Capacitor | Metal Foil Ceramic | Capacitor Metal Foil Ceramic | Metal Foil Capacitor |
| Dielectric Type | Polypropylene | $CaZrO_3$ | $BaTiO_3$ | $Pb(Mg_{1/3}Nb_{2/3})O_3$ |
| Dielectric Thickness (µm) | 2.8 | 8 | 16 | 20 |
| Dielectric Constant | 2.2 | 31 | 2000 | 18000 |
| Irms | 80 | 80 | 80 | 80 |
| µF | 1600 | 2761.82 | 44545.45 | 256581.82 |
| Vdc | 750 | 750 | 750 | 750 |
| $cm^3$ | 1282 | 1282 | 1282 | 1282 |
| µF × Vdc/$cm^3$ | 936 | 1615 | 26051 | 150052 |
| µF/$cm^3$ | 1.25 | 2.15 | 34.73 | 200.07 |
| µF × Vdc × Irms/$cm^3$ | 74,855.90 | 129,211.50 | 2,084,056.37 | 12,004,164.71 |
| Joule/cc | 0.35 | 0.61 | 9.77 | 56.27 |

Metal foil ceramic capacitors (MFCC) require thicker coatings and therefore the overlap areas are reduced. Even allowing for this in the calculations presented in Table 1, and allowing for a large margin of error in these calculations, the higher energy density afforded by MFCC is apparent.

Conventional film capacitors can only perform at maximum typical temperatures of 125° C. These maximum temperatures can only be exceeded for short periods of time, typically less than 1 hour, before the film capacitor reliability is compromised. Since metal foil ceramic capacitors comprise metal and ceramic by selecting polymer and terminations that are stable at >125° C. these capacitors can perform at higher temperatures for many hours.

A particular feature of the instant invention is the ability to utilize ceramic dielectrics with conductive polymer film or impregnated papers. Such structures were not previously available due to the difficulty associated with sintering of a dielectric on a polymer substrate. Particularly suitable polymer films include polypropylene, polyethylene terephthalate, polyethylene naphthalene and polyphenylene sulfide the properties of which are known.

A particular advantage of the instant invention is the ability to functionalize capacitors. This has currently proven to be very difficult due to the inability of materials of different compositions to be able to withstand sintering of the adjacent materials.

The focused heating of the high frequency pulse lighting also makes it possible for sintering the conductive pastes used for end terminations on the MLCC. There is a delicate tradeoff between the optimum sintering temperature of these inks and the sintering temperature of the ceramic when using a conventional sintering oven. This technology provides the means to sinter the conductive ink at a higher optimum temperature in the range of 600-900° C. resulting in a much denser conductive termination without subjecting the ceramic body of the MLCC to a higher temperature and possibly degrading the integrity of the MLCC ceramic body.

High intensity and high frequency pulsed light energy allows capacitor terminations to be formed on capacitors using conductive traces which are not normally compatible with the choice of termination. Sintering metal filled inks or pastes which typically require sintering temperatures in the range of 600° C. to 1000° C. can be sintered onto low temperature substrates or organic films that start to degrade at temperatures in excess of 150° C. These inks or pastes typically consist of a metal such as silver, palladium, platinum, or gold or combinations thereof, or special inks based on base metals such as CuO+reducing agents that will reduce the CuO to Cu during the sintering process. Since this technology does not impart high sintering temperatures to the substrate or adjacent layer each layer can be formed without detriment to adjacent layers. This allows for the formation of air sintered materials in one layer and materials which must be sintered in reducing atmospheres to be used in the same capacitor which was previously not easily accomplished. This allows for a mixing of technologies without degrading the properties of either material system.

In charging circuits, it is sometimes desirable to bleed the charge from a charged capacitor when it is desirable decharge the circuit. To bleed the charge from the circuit requires the addition of a bleed resistor to the circuit where the bleed resistor is connected to ground. The rate at which the charge can be drained from the charged capacitor is determined by the resistance value of the resistor. Physically, the addition of a bleed resistor can be accomplished in either of two methods. First, a discrete resistor can be added to the circuit which requires added space on the circuit board to which it is mounted. This method also requires additional machine placement time to place the resistor which may add additional assembly costs. A second and more desirable method involves integrating the resistor with the capacitor and utilizing the surface of the capacitor to place the resistor. This option reduces circuit board real estate and reduces circuit board assembly costs by replacing two components with one.

The prior art method of providing capacitors with integral resistors relies on the use a multilayer ceramic capacitor (MLCC) with precious metal electrodes (PME). This selection is important because the PME electrode system is made up of silver, palladium, and or platinum in a paste form and is sintered in air. The importance of sintering in air is that the resistor ink used to create a resistor is also sintered in air, thus making a compatible processing system. The resistor is created when a layer of resistive ink or paste is selectively deposited to the surface of the capacitor by a screen printing process. Once deposited the ink is then sintered in an air atmosphere in a temperature range of 600° C.-850° C. depending on the composition of the resistive ink. However, due to the volatility of precious metal market prices of silver, palladium, and platinum, the costs of capacitors using the PME system is also subject to the metal market prices which may make the PME capacitor less attractive due to a potentially higher cost.

The present invention allows for the use of a more cost effective approach which is an MLCC that utilizes a base metal electrode system (BME) or commonly known as nickel electrodes. Nickel is several times less expensive than silver or palladium thus making MLCC that utilize the BME electrode system less costly. BME electrodes require sintering in a controlled atmosphere of nitrogen or forming gas to eliminate the formation of oxides during the high temperature sintering process. However, this creates a material processing incompatibility between the BME electrode system and the resistor system. The most stable resistor inks are sintered in air because the resistive ink formulation uses ruthenium which has a very predictable rate of oxidation which translates into a predictable rate of resistance when sintered in air. In addition to ruthenium oxide, tantalum nitride or a deposit of nickel chromium can be suitable employed as the resistor ink. As a result, if the air sintered resistor is applied to the BME MLCC and sintered in air, the capacitance of the BME MLCC will be degraded or conversely if the air sintered resistor is sintered in nitrogen or forming gas atmosphere its resistance properties will be degraded. BME MLCCs have not been previously considered for use with integral resistors due to the complexities related to the sintering of the various layers at the detriment of other layers. The process incompatibility between the resistor ink and the BME MLCC was previously considered a significant technical barrier.

Until now, the printing of an air sintered resistor onto the surface of a BME MLCC was not practicable due to the incompatibility of the materials and their processes.

The present invention utilizes high intensity, high frequency light pulses that imparts high energy into metal materials causing them to generate sufficient heat to sinter while not affecting the substrate on which they are deposited. It has been successfully demonstrated that thick film conductive inks that typically sinter in the range of 600° C. to 800° C. have been sintered on low temperature substrates such as paper and mylar films without degrading the substrate material. The high intensity, high frequency lighting utilizes a photon emission source such as a xenon flash lamp in a strobe head connected to an adjustable power supply. The adjustable power supply has a preferred energy capability of 5-600 joules. The pulse duration can be as long as several minutes with 1 microsecond to 100 milliseconds at a pulse frequency up to 40 Hz typically being suitable for demonstration of the teachings herein. The high intensity, high pulse frequency lighting system preferably utilizes wavelengths in the ultraviolet range.

The high intensity high frequency lighting system sintering of air fired resistors onto the surface of a BME MLCC. This can be accomplished because the energy of the high intensity high frequency light source imparts enough energy into the metal flakes of the ink causing the ink to sinter and since the heat generation is localized within the ink itself, and not imparted to the substrate, oxidation of the BME electrode system is eliminated. By utilizing the high intensity high frequency lighting technology it is now possible to sinter air compatible resistor systems that are printed on BME MLCC's without degrading the performance of the BME MLCC. This capability makes it now possible to produce cost effective BME MLCC capacitors having bleed resistors printed on the surface of the BME MLCC and sintered.

U.S. Pat. No. 7,820,097, which is incorporated herein by reference, allows high temperature materials to be sintered onto low temperature substrates for use in capacitors having materials sensitive to temperatures exceeding 100° C. This provides the opportunity to sinter air fired materials onto ceramic capacitors having Base Metal Electrodes that require being sintered in reducing atmospheres. In this case the air sintered materials can be printed onto the surface of the BME capacitor and then passed under the high intensity light source to sinter the air fired materials. Since the base substrate does not see significant heat, the base metal Ni electrodes will not oxidize thus maintaining the electrical performance during the air sintering process.

Ruthenium dioxide is a particularly preferred material for use in air sintered resistive inks and silver, palladium, platinum, or gold are used in air sintered conductive inks for terminations. If ruthenium based resistive inks or silver or palladium conductive inks are used in conjunction with MLCC's having nickel electrodes and the electrodes are not oxidized after the inks are sintered then it is highly probable that an alternative sintering process other nitrogen or forming gas is being used. Air sintered materials whether resistive or conductive inks will not have the desired electrical or mechanical properties if sintered in nitrogen or forming gas.

Figure 12:
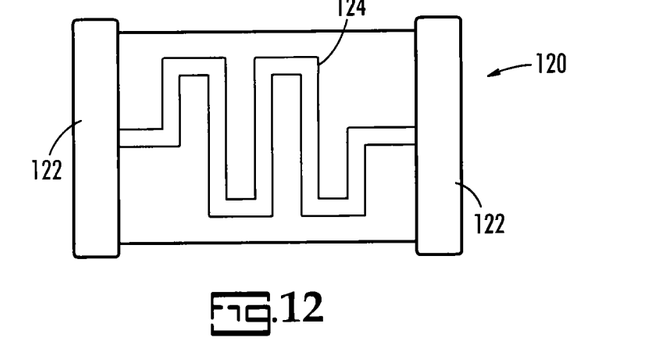
FIG. 12 is a top schematic view of an embodiment of the invention.

An embodiment of the invention is illustrated in FIG. 12. In FIG. 12, an MLCC capacitor, 120, preferably with BME internal electrodes, comprises external terminations, 122, of opposing polarity. The external terminations are applied and preferably sintered by high energy high frequency pulsed radiation which allows the external termination to be sintered without heating the internal electrodes or dielectric. A pattern, 124, is formed on the surface of the MLCC, preferably in a predetermined pattern, and sintered by high energy high frequency pulsed radiation either in a separate step or simultaneously with the sintering of the external terminations. The pattern is illustrated as being in electrical connection with each external termination which would typically be the case for a resistive trace thereby forming a resistor in parallel with the capacitor which is commonly employed as a bleed resistor. The pattern can be conductive or resistive as would be realized from the teachings herein.

Figure 13:
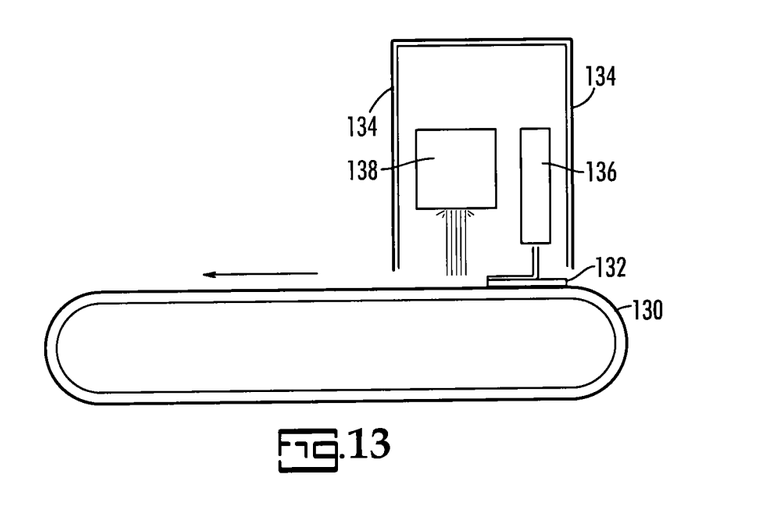
FIG. 13 is a side schematic view of an embodiment of the invention.

An embodiment of the invention will be described with reference to FIG. 13. In FIG. 13, a parts transporter, 130, such as a conveyor transmits parts, 132, through a printing system, 134. The printing system comprises two components which may be integrally adapted or separated from each other in time and space. The first component is a print component, 136, wherein a material is applied to the part. The layer may be a ceramic precursor layer as described elsewhere herein, a metal containing layer on the ceramic which will function as in internal electrode, an external termination paste or a circuit trace on the surface of an MLCC. The second component is a high intensity high frequency light source, 138, which sinters the layer applied in the print component. While illustrated as a single system, the print system may include multiple print components and multiple high intensity high frequency light source with the part passing through print components and high intensity high frequency light sources sequentially to apply as many layers as appropriate. For manufacturing convenience it is preferable to have the print component and associated high intensity high frequency light source in close proximity to minimize handling requirements and manufacturing space requirements. The parts may be printed on one parts transporter and transferred to a separate parts transporter even though this is typically not desired.

The invention has been described with specific reference to the preferred embodiments without limit thereto. One of skill in the art would realize additional embodiments and alterations which are not specifically stated but which are within the scope of the invention as set forth in the claims appended hereto.

The invention claimed is:

1. A method of making a metal foil coated ceramic, comprising:
   providing a metal foil;
   applying a ceramic precursor to said metal foil wherein said ceramic precursor comprises at least one susceptor, a high dielectric constant oxide and an organic binder, and
   sintering said ceramic precursor at a temperature of at least 600 to no more than 1000° C. with an ultraviolet light having a pulse duration of 1 microsecond to 100 milliseconds and a pulse frequency of up to 40 Hz to form said metal foil coated ceramic.

2. The method of making a metal foil coated ceramic of claim 1, wherein said ceramic precursor comprises at least one of a nano-oxide or nano-metal susceptor.

3. The method of making a metal foil coated ceramic of claim 2, wherein said nano-metal susceptor is selected from the group consisting of Cu, Ag, Li, Pb, Bi, B, Al and Zn.

4. The method of making a metal foil coated ceramic of claim 2, further comprising forming an adhesive layer to said foil wherein said adhesive layer comprises one of said nano-oxide or nano-metal susceptor.

5. The method of making a metal foil coated ceramic of claim 4, wherein said nano-oxide comprises copper aluminum oxide.

6. The method of making a metal foil coated ceramic of claim 1, wherein said metal foil comprises a material selected from the group consisting of aluminum, copper, zinc, titanium, nickel, steel, platinum, palladium, silver and gold.

7. The method of making a metal foil coated ceramic of claim 1, wherein said susceptor is selected from the group consisting of CuO, $Ag_2O$, $Cu_2O$, $BaCuO_2$, PbO, $Bi_2O_3$, $ZnO/B_2O_3$, $Li_2O$, $Li_2SiO_3$, $CaO/B_2O_3$, $SiO_2$, $GeO_2$ and $SrO/B_2O_3$.

8. The method of making a metal foil coated ceramic of claim 1, wherein said high dielectric constant oxide is selected from the group consisting of $BaTiO_3$, $SrTiO_3$, $CaZrO_3$, $Pb(Mg_{1/3}Nb_{2/3})O_3$, $Pb(Zr_{1/2}Ti_{1/2})O_3$ including $La_2O_3$, $PbTiO_3$ and mixtures or solid solutions thereof.

9. The method of making a metal foil coated ceramic of claim 1, wherein said sintering with said ultraviolet light occurs on a curved surface of said ceramic precursor.

10. A method of forming a metal foil ceramic capacitor, comprising:
    applying a conductor to said ceramic of said metal foil ceramic of claim 1, opposite said metal foil.

11. The method of making a metal foil ceramic capacitor of claim 10, further comprising applying a paste to said metal foil ceramic capacitor.

12. The method of making a metal foil ceramic capacitor of claim 11, further comprising sintering said paste with a second ultraviolet light to form said conductor.

13. The method of making a metal foil ceramic capacitor of claim 12, further comprising masking and etching said conductor to form a circuit.

14. The method of making a metal foil ceramic capacitor of claim 10, further comprising segmenting said metal foil ceramic capacitor.

15. The method of making a metal foil ceramic capacitor of claim 10, further comprising forming vias in said metal foil.

16. The method of making a metal foil ceramic capacitor of claim 10, further comprising applying a polymeric insulator material to define discrete areas of said ceramic.

17. The method of making a metal foil ceramic capacitor of claim 10, further comprising winding, stacking, or folding of said metal foil ceramic capacitor to form a layered metal foil ceramic capacitor.

18. The method of making a metal foil ceramic capacitor of claim 17, further comprising molding said layered metal foil ceramic capacitor in insulating polymer, exposing internal electrodes and forming external terminals of opposed polarity with one external terminal of said external terminals in electrical contact with said conductor and a second external terminal of said external terminals in electrical contact with said metal foil.

19. The method of making a metal foil ceramic capacitor of claim 10, further comprising forming said metal foil on a polymeric carrier film.

20. The method of making a metal foil ceramic capacitor of claim 10, wherein said ceramic precursor comprises at least one of a nano-oxide or nano-metal susceptor.

21. The method of making a metal foil ceramic capacitor of claim 20, wherein said nano-metal susceptor is selected from the group consisting of Cu, Ag, Li, Pb, Bi, B, Al and Zn.

22. The method of making a metal foil ceramic capacitor of claim 10, wherein said metal foil comprises a material selected from the group consisting of aluminum, copper, zinc, titanium, nickel, steel, platinum, palladium, silver and gold.

23. The method of making a metal foil ceramic capacitor of claim 10, wherein said susceptor is selected from the group consisting of CuO, $Ag_2O$, $Cu_2O$, $BaCuO_2$, PbO, $Bi_2O_3$, $ZnO/B_2O_3$, $Li_2O$, $Li_2SiO_3$, $CaO/B_2O_3$, $SiO_2$, $GeO_2$ and $SrO/B_2O_3$.

24. The method of making a metal foil ceramic capacitor of claim 10, wherein said high dielectric constant oxide is selected from the group consisting of $BaTiO_3$, $SrTiO_3$, $CaZrO_3$, $Pb(Mg_{1/3}Nb_{2/3})O_3$, $Pb(Zr_{1/2}Ti_{1/2})O_3$ including $La_2O_3$, $PbTiO_3$ and mixtures or solid solutions thereof.

25. A method of forming a circuit, comprising embedding the metal foil ceramic capacitor of claim 10 in a circuit board.

* * * * *